United States Patent [19]

Takada

[11] 4,262,934
[45] Apr. 21, 1981

[54] INPUT MOTION COUPLING TO A MOTION AMPLIFIER FOR USE IN PASSIVE SEAT BELT RESTRAINT SYSTEMS

[76] Inventor: Juichiro Takada, 3-12-1 Shinmachi Setagayoku, Tokyo, Japan

[21] Appl. No.: 32,341

[22] Filed: Apr. 23, 1979

[30] Foreign Application Priority Data

Jul. 31, 1978 [JP] Japan ............................ 53-092586

[51] Int. Cl.³ .......................................... B60R 21/10
[52] U.S. Cl. .................................................. 280/804
[58] Field of Search ...................... 280/803, 804, 802; 297/469

[56] References Cited

U.S. PATENT DOCUMENTS 3,857,581  12/1974  Kaneko ................................ 280/802

FOREIGN PATENT DOCUMENTS 1416592  12/1975  United Kingdom ...................... 297/469

*Primary Examiner*—John A. Pekar
*Attorney, Agent, or Firm*—Brumbaugh, Graves, Donohue & Raymond

[57] ABSTRACT

A passive vehicle occupant restraint belt system includes a restraining belt and apparatus for moving the belt between an occupant-restraining and an occupant-releasing position in response to the closing and opening of the door of the vehicle. A belt transfer device engages the lap or shoulder belt, moves the belt between the restraining and the releasing positions and is actuated by a motion transmission mechanism which transmits and amplifies opening and closing motions of the door to the belt transfer device. The transmission includes a motion amplifier mounted on either the vehicle body or door and a linkage having one end attached to the other of the body and door and the other end coupled to an input component of the motion amplifier so that opening and closing movement of the door is transmitted through the linkage to the motion amplifier. The linkage incorporates an interrupting mechanism which is actuated by a detector sensing the presence or absence of an occupant in a vehicle seat to actuate the interrupting mechanism when the seat is empty. With the seat empty and the interrupting mechanism actuated, the belt will not be moved between its releasing and restraining positions when the door is closed or opened.

3 Claims, 14 Drawing Figures

INPUT MOTION COUPLING TO A MOTION AMPLIFIER FOR USE IN PASSIVE SEAT BELT RESTRAINT SYSTEMS

BACKGROUND OF THE INVENTION

This invention relates to a passive vehicle occupant restraint belt system in which the belt is automatically, easily and effectively transferred between an occupant-restraining and an occupant-releasing configuration in response to opening and closing movements of a vehicle door.

In recent years, there have been many proposals for passive occupant restraint systems for vehicles. The most common types of restraint systems are those based on restraint belts, and most of the proposed passive belt systems include a belt transfer mechanism which is driven by an electric motor or a mechanical lever or gear transmission. In the case of mechanical drives, a motion transmitting device is coupled between the belt transfer device and the vehicle or door for transmitting and amplyifying the door opening and closing movements. One such mechanical device, which is capable of moving the restraint belt from an occupant-restraining to the occupant-releasing position in response to the partial opening of the door is shown and described in commonly-owned U.S. patent application Ser. No. 950,020 filed Oct. 10, 1978.

In operation, when a vehicle occupant opens the door, the belt is automatically moved from its restraining to its releasing position and the passenger is free to get out of the vehicle. Correspondingly, when the door is closed, the belt moves back to its occupant-restraining position. The back and forth movement of the belt occurs every time the door is opened and closed, whether or not there is a passenger occupying the seat at the time. When a passenger leaves the vehicle and closes the door, the system functions, even though there is no occupant. This means, in fact, that about one-half of the operating cycles are unnecessary.

SUMMARY OF THE INVENTION

There is provided, in accordance with the present invention, an improvement in a passive vehicle occupant restraint belt system of the type which includes apparatus for moving a restraint belt from an occupant-restraining to an occupant-releasing position in response to opening of the door. Such apparatus moves the belt by transmitting the opening motion of the door through a linkage to an amplifier, which, in turn, drives a belt transfer device, such as a wire, a racked wire, or a tape connected to a transfer guide which engages the belt. The improvement is an interrupting mechanism which deactivates the linkage so that when the door is closed or opened with the seat empty, the door closing movement will not be transmitted to the motion amplifier and, instead, will be exhibited as lost motion within the linkage.

More particularly, one form of belt transfer mechanism comprises a belt transfer device engaging the belt and arranged to move the belt from the restraining to the releasing position and a motion transmitting device coupled to the belt transfer device for transmitting and amplifying the opening motion of the door to the belt transfer device. The transmission device includes a mechanical motion amplifier mounted on either the vehicle body or the door and linkage having one end attached to the door (when the amplifier is mounted on the body) or to the body (when the amplifier is mounted on the door). The other end of the linkage is coupled to an input component of the motion amplifier.

In the present invention a detector mechanism, which is responsive to the weight on the seat, is associated with the vehicle seat and is coupled to an interrupting mechanism forming part of the linkage of the belt transfer mechanism. When a person occupies the seat, the linkage operates in its normal manner to transmit the opening and closing movements of the door to the motion amplifier which, in turn, transfers the belt. When the seat is empty, however, the detector actuates the interrupting mechanism, and the opening and closing movements of the door are absorbed as lost motion within the linkage. Therefore, none of the opening and closing movements of the door will be transmitted through the linkage to the motion amplifier, and the belt transfer mechanism will remain stationary.

In one form of the interrupting mechanism, the linkage includes a pair of links attached at a common joint and a sleeve which can be selectively moved over the joint to maintain the two links rigid relative to each other and thereby transmit door motion through the linkage to the belt transfer mechanism. When there is no occupant in the seat, the sleeve is moved to a position away from the joint so that the links are free to pivot relative to each other and will articulate at the joint without transmitting motion to the motion amplifier. As the door is opened or closed, the door movement is absorbed in the linkage and is exhibited as lost motion in the articulating links.

In an alternative form of the interrupting mechanism, a piston and a cylinder containing an incompressible liquid are interposed in the linkage, and an auxiliary tank communicates with the cylinder through a valve. When a person occupies the seat, the valve is closed by the weight detector so that the piston is unable to move in the cylinder; therefore, the opening and closing movements of the door will be transmitted through the linkage to the motion amplifier. When the seat is empty, however, the detector causes the valve to open. Force on the piston will no longer be transmitted by the fluid in the cylinder to the motion amplifier; rather, as the door moves, the piston moves within the cylinder because the fluid in the cylinder is displaced into the auxiliary chamber.

In a third form of interrupting mechanism, one end of the linkage is attached to the vehicle body or door by a retractable pin. With an occupant in the seat the detector actuates a reciprocating mechanism coupled to the pin so that the pin enters a hole in the linkage, thereby connecting the linkage between the door and vehicle body. As the door is opened or closed, door opening and closing movements are transmitted through the linkage to the motion amplifier. When the seat is empty, however, the detector causes the reciprocating mechanism to retract the pin from the hole, and the linkage is detached and moves relative to the door or vehicle body. The door may be freely closed and re-opened without actuating the motion amplifier.

A passive belt system having an interrupting mechanism in accordance with the present invention operates in the usual manner to transfer the belt to the passenger-releasing position when the door is opened with someone in the seat. If the door is again closed with the occupant still in the vehicle, the belt will move back to the restraining position in the usual manner. If the door is opened and the passenger gets out, leaving the seat empty when the door is closed, the interrupting mechanism is actuated, and the belt will remain in its releasing position. Correspondingly, when the door is again opened, the door opening movement will again not be transmitted to move the belt, which is already in its releasing position so the passenger can get in. The invention eliminates wasted movement of the belt, thus reducing the wear on the restraint system, particularly the transfer mechanism. Moreover, the force required to open and close the door when the seat is empty is less that needed when the belt is transferred.

The present invention may be used as well with a linkage and motion amplifier designed to move the belt from its occupant-restraining to its occupant-releasing positions in response to a partial opening of the door. In this form, the linkage has a first link attached at one end to the vehicle body or door, a second link attached at one of its ends to the motion amplifier, and a connecting link attached to the free ends of the first and second link. A guide system controls the linkage motion to maintain the first and second link substantially rigid relative to each other during part of the door opening movement but to allow the first link to pivot relative to the second link during another part of the door opening movement so that further door opening movement is exhibited as lost motion in the linkage. The interrupting mechanism, in any of the forms described above, may be part of the first or second link.

For a better understanding of the invention, reference may be had to the following detailed description of the preferred embodiments, taken in conjunction with the accompanying drawings.

DETAILED DESCRIPTION OF THE PREFERRED EMBODIMENTS

Figure 1:
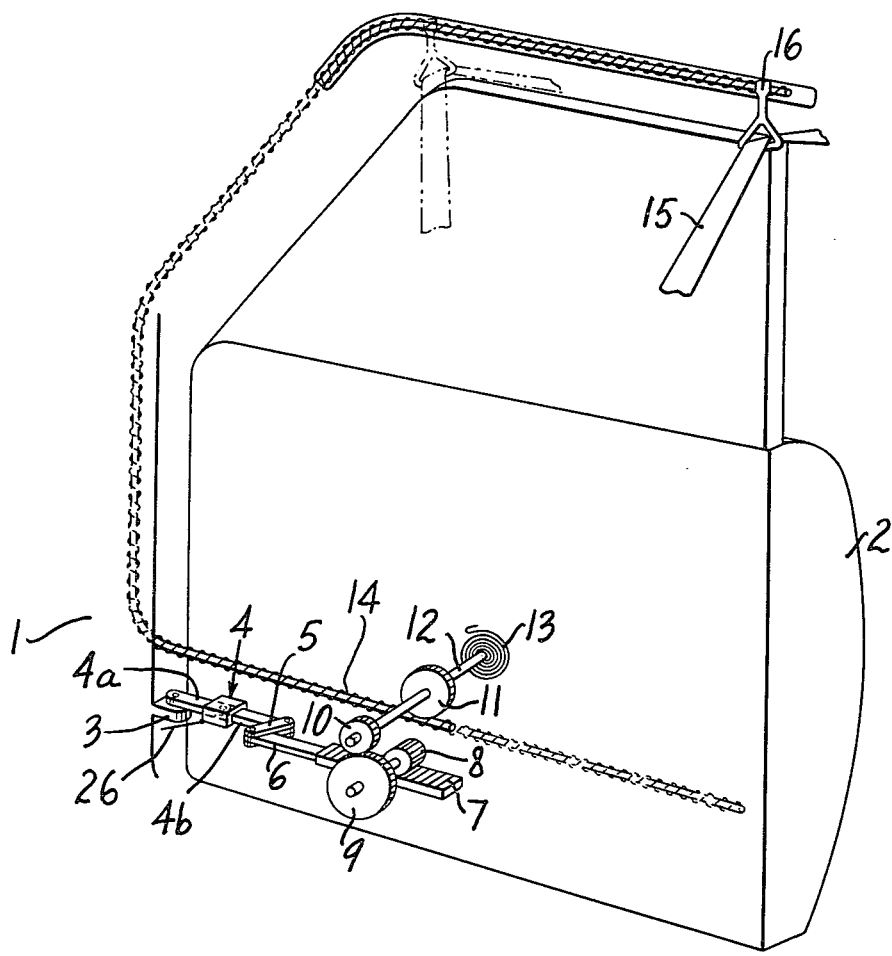
FIG. 1 is a pictorial view in schematic form of an embodiment of a belt restraint system in the occupant-releasing configuration.

FIG. 1 shows portions of a shoulder belt restraint system in the occupant restraining configuration in solid lines, and in the occupant-releasing configuration in dash-double dotted lines. The belt 15 is attached at one end to the inside of the vehicle body in the roof, commonly to a buckle (not shown), above and behind the seat and extends through the belt transfer guide 16 and diagonally across one of the vehicle seats (not shown) to a retractor mounted on the seat or the vehicle floor below and generally behind the inboard side of the passenger.

The belt transfer guide 16 is movable in a track from the occupant-restraining position (solid lines) forward to the occupant-releasing position (dash-double dotted lines) in response to opening and closing movements of the door. A linkage connected at one end to the vehicle body 1 drives a motion amplifier as the door is opened and closed. The output of the amplifier is coupled to a wire 14 connected to the transfer guide, so in effect opening and closing movements of the door are transmitted through the linkage and amplifier to the belt transfer guide.

The motion amplifier includes an input pinion 8, which is driven by gear rack 7, a large gear 9 concentric to and rotatable with the input pinion 8, a second pinion 10 driven by the large gear 9, and an output gear 11 concentric with the second pinion 10 and rotatable therewith. The output gear 11 engages the racked wire 14 to move the wire 14 and thereby the belt transfer guide 16 back and forth. A spiral torsion spring 13 is also connected to the motion amplifier on a common shaft 12 with the output gear 11 for storing energy when the door is closed and returning stored energy when the door is opened, thereby to assist in driving the belt transfer device.

One form of the linkage for transmitting the opening and closing movements of the door to the motion amplifier is shown in FIGS. 2-7. The basic linkage is described in greater detail in commonly-owned U.S. patent application Ser. No. 950,020 filed Oct. 10, 1978, which is incorporated herein by reference. The linkage assembly contains a first link 4 having one end pivotally attached to a bracket 3 on the vehicle body 1, a second link 6 having a gear rack 7 at one end, and a cross-link 5 pivotally connected between the free ends of the first and second links 4 and 6, by pins 18 and 17, respectively.

Figure 4:
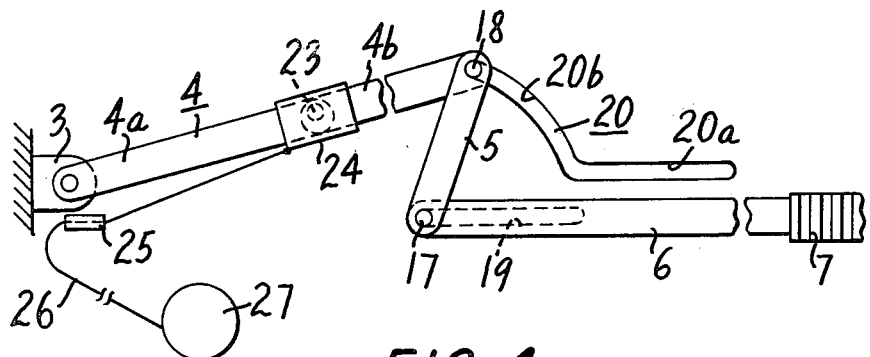
Figure 5:
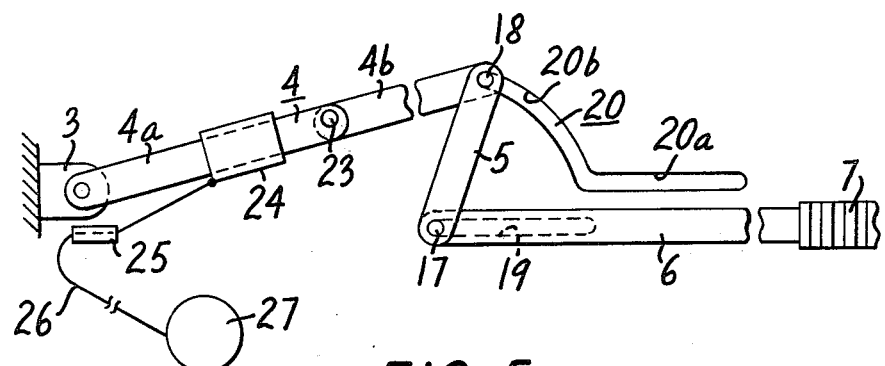
FIGS. 5-7 are schematic representations of the linkage shown in FIGS. 2-4 during various stages of door closing movement, as would occur when the vehicle seat is empty.
Figure 6:
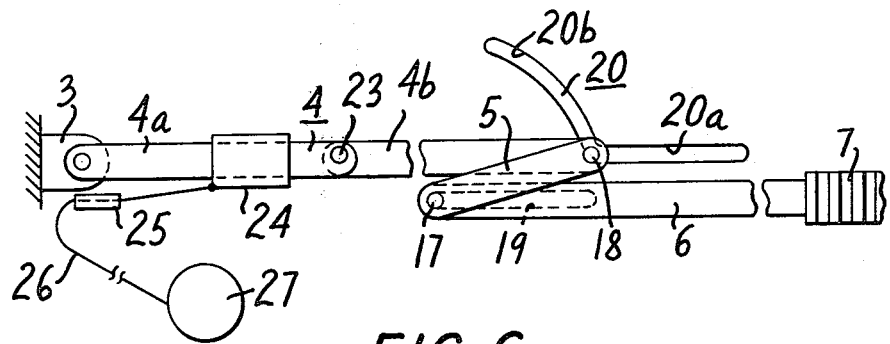
Figure 7:
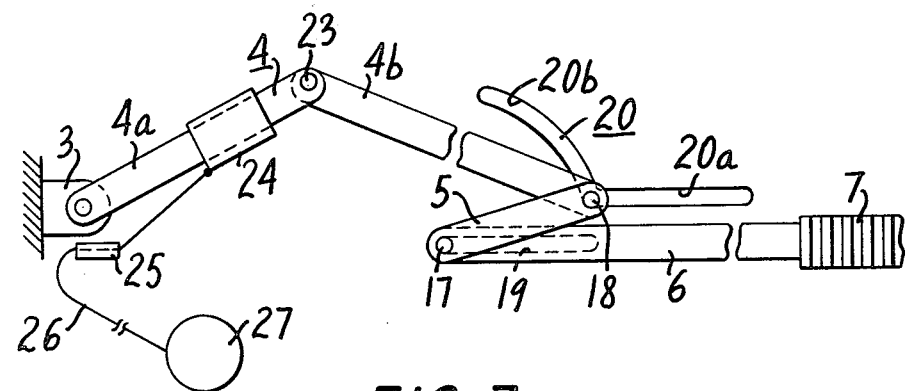

The first link 4 consists of two parts 4a and 4b pivotally connected at a common joint 23. A sleeve 24 is movable between a locking position, where it is closely fitted over the links 4a and 4b at the joint 23 to lock the two joints relative to each other (FIGS. 2-4), and a release position spaced apart from the joint 23, where it allows the links 4a and 4b to be free to pivot relative to one another (FIGS. 5-7). The position of the sleeve 24 is controlled by a detector 27 which is attached to the vehicle seat (not shown) to respond to the presence of an occupant in the seat and move the sleeve 24 to its locking position whenever a passenger is seated and to its release position when the seat is empty. As shown schematically, the detector 27 may be coupled to the sleeve 24 by a sheathed cable, the sheath portion 25 being rigidly attached to the vehicle and the cable 26 being extended when an occupant sits in the seat. This may be done quite readily, since a vehicle seat will be depresed when an occupant sits down, and therefore the weight of the passenger will actuate the detector. Alternatively, the detector 27 and actuator assembly could include a solenoid and a weight activated switch attached to the seat.

Figure 2:
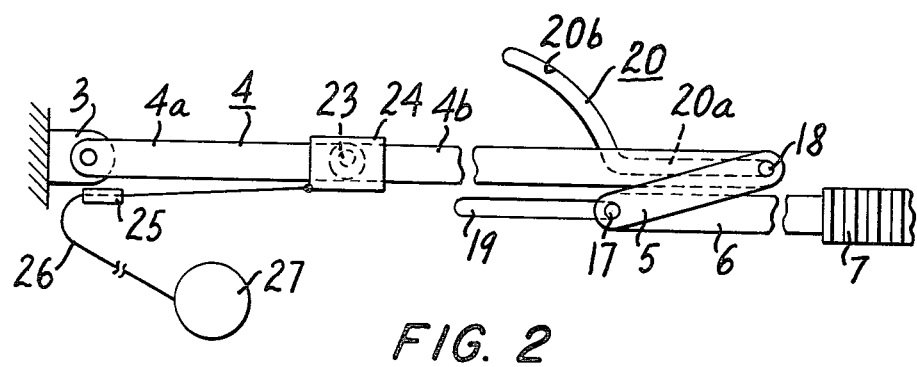
FIGS. 2-4 are schematic representations of a detector and one form of linkage for transmitting door opening movement to the motion amplifier during various stages of door opening movement, as would occur when an occupant is present in the vehicle seat.

The position of the first link 4 relative to the second link 6 during the opening motion of the door is controlled by guide slots 19 and 20 which receive and guide the pins 17 and 18, respectively. FIG. 2 shows the linkage in the configuration it assumes when the door in its closed position, the belt in its occupant-restraining position, and a passenger seated in the vehicle. The detector 27, sensing the presence of an occupant in the vehicle seat, maintains the sleeve 24 in its locking position over the joint 23. As the vehicle door is opened, the first link 4 and second link 6 are moved toward the position shown in FIG. 3, which represents the approximately half-way open position of the door. As can be seen, the guide 19 and the straight portion 20a of the guide 20 keep the first and second links folded (non-articulating) so that the door opening movement is transmitted to the input 7 of the motion amplifier. In this form of linkage, the amplifier is designed to move the belt transfer guide completely from the occupant-restraining position to the occupant-releasing position in response to the partial opening motion of the door along guide 20a, since as described below, no further door opening movement will be transmitted to the motion amplifier.

Figure 3:
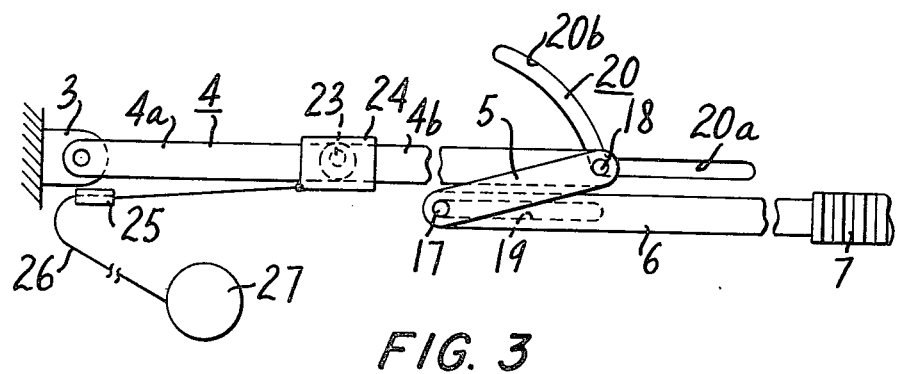

When the door reaches the half-way opened position, the pivot 17 has reached the end of the guide 19, and thus the second link 6 is unable to move further and impart further motion to the door amplifier (FIG. 3). Further door opening movement, however, is permitted, inasmuch as the second pivot 18 has reached an arcuate portion 20b of the guide 20 which permits the first link 4 to pivot away from the second link 6 as the door is opened further (FIG. 4). Thus the movement of the door from its half-way open to its fully open position is exhibited as lost motion in the linkage and will not be transmitted to the motion amplifier.

With the door fully open, if the door were again closed with an occupant still in the seat, the door closing movement would be the reverse of that shown in FIGS. 2-4, and once again the belt would be moved to its occupant-restraining position by the time the door had been fully closed.

FIGS. 5 to 7 show the linkage and interrupting mechanism in the configuration they assume when there is no one in the seat. As the passenger gets up from the seat, the detector 27 moves the sleeve 24 to its release position spaced from the joint 23.

When the door is moved from its fully open position (FIG. 5) towards its half-way open position (FIG. 6), the pivot 18 moves along the arcuate portion 20b of the guide 20, as it would whether or not an occupant was present in the seat. This will occur inasmuch as there is substantially no resistive force on the first link 4 or cross-link 5, since none of the door closing movement is translated to the motion amplifier. When the door reaches its half-way closed position (FIG. 6), the pivot 18 has reached a portion 20a of the guide 20 where further closing movement would ordinarily be transmitted to the motion amplifier to move the belt from its releasing position to its restraining position. Thus, after the linkage has reached the guide portions 20a, further closing of the door imparts a force through the linkage. Upon encountering this force, however, instead of being rigidly transmitted, the links 4a and 4b of the first link 4 are free to pivot relative to one another about joint 23, and will transmit none of the force to the motion amplifier. Instead, the additional door closing movement from its half-way closed to its fully closed position will be exhibited as lost motion in the linkage, as shown in FIG. 7.

Figure 8:
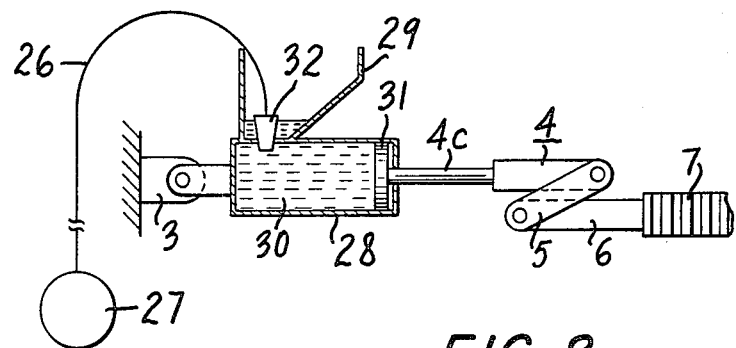
FIGS. 8 and 9 are schematic representations of a detector and another form of linkage for transmitting door opening movement to the motion amplifier, shown with and without an occupant present in the vehicle seat, respectively.
Figure 9:
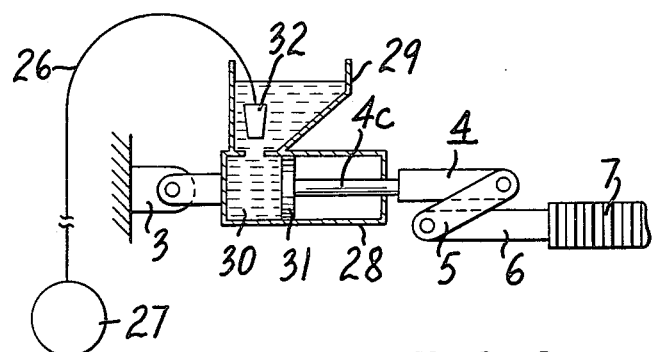

A similar linkage for transmitting the opening and closing movements of the door to the input 7 of the motion amplifier, but with an alternative form of interrupting mechanism, is shown in FIGS. 8-9. In this embodiment, a piston and cylinder arrangement is interposed between the first link 4 and the door which may selectively either rigidly transmit forces through the linkage, or absorb the motion of the door within the piston and cylinder, depending upon whether the seat is empty.

As in the embodiment shown in FIGS. 2-7, a detector 27 is coupled to the vehicle seat responsive to the weight of a vehicle occupant in the seat. The detector 27 actuates a valve 32 by a wire 26 or other suitable coupler. The cylinder 28 includes a piston 31 attached by a piston rod 4c to the first link 4, and communicates with an auxiliary fluid chamber 29 through the valve 32. The cylinder contains an incompressible fluid 30, so that when the valve is closed, the piston 31 is unable to move in the cylinder 28.

As shown in FIG. 8, when the detector 27 senses the presence of an occupant, the valve is moved to a closed position, and therefore the opening and closing movements of the door will be translated through the linkage 4, 5 and 6 in the same manner as in FIGS. 2-4, wherein the belt is moved from its restraining to its releasing position, when the door is moved from its closed to its half-way open position.

When the detector 27 senses that there is no occupant present in the vehicle seat, however, the detector 27 opens the valve 32 and the cylinder communicates freely with the auxiliary reservoir 29. Thus, as the door is closed, once the door reaches the position corresponding with FIG. 6, further door closing movement will not be transmitted through the linkage. As the piston experiences the force of the door closing, it moves within the cylinder 28 and displaces fluid 31 into the auxiliary reservoir 29 until the door reaches its closed position, shown in FIG. 9. Thus the door closing movement which otherwise would actuate the belt transfer device to move it to its restraining position is absorbed within the piston and cylinder unit.

Figure 10:
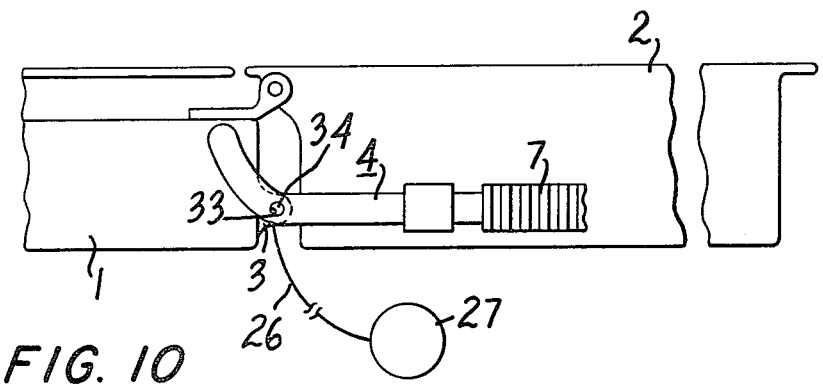
FIGS. 10-12 are schematic representations of a detector and third form of linkage for transmitting door opening movement to the motion amplifier, during three stages of door opening movement, as would occur with an occupant present in the vehicle seat.
Figure 11:
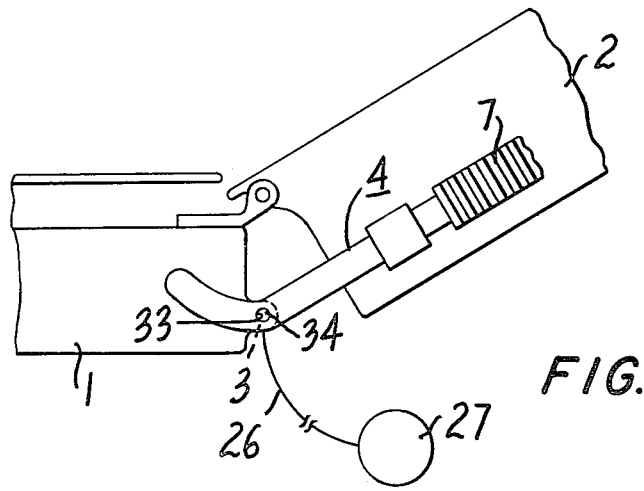

Another linkage with an interrupting mechanism actuated when the vehicle seat is empty is shown in FIGS. 10-14. In this embodiment, a single link 4 is connected between an input 7 of the motion amplifier and the vehicle body 1 by a retractable pin 34 received in a cooperating hole 33 in the link 4. As shown in FIGS. 10 and 11, when the detector 27 senses the presence of an occupant in the vehicle seat, the pin 34 engages the hole 33, so that as the door 2 is moved from its closed position (FIG. 10) to its half-way open position (FIG. 11), the opening movement of the door is transmitted through the link 4 to the input 7 of the motion amplifier to actuate the belt transfer device. At its half-way open position, the pin 34 may be retracted from the hole 33 to permit the door to be opened to its fully open position (FIG. 12), by any suitable mechanism responsive to the position of the door.

Figure 12:
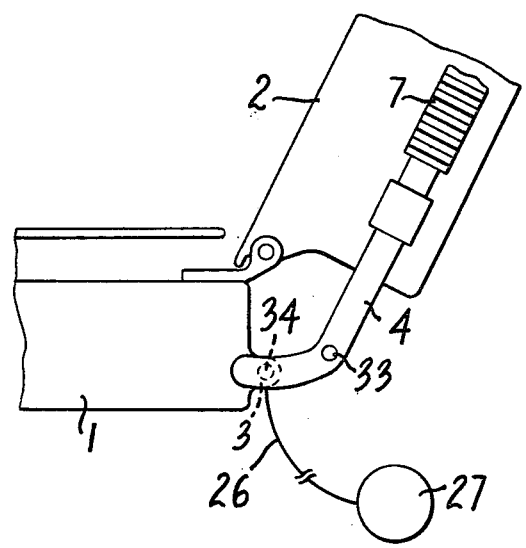

When the door is closed, if the detector 27 senses the presence of an occupant in the vehicle seat, the closing motion of the linkage will be the reverse of FIGS. 10-12, and the hole 33 will receive the pin when the door is moved past its half-way closed position. Further door closing movement will therefore be transmitted through the link 4 to the motion amplifier to move the belt transfer device to the occupant-restraining position.

Figure 13:
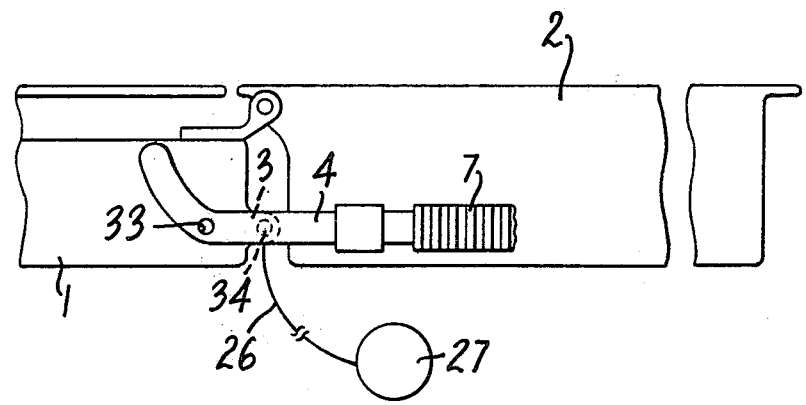
FIG. 13 is a schematic representation of the linkage shown in FIG. 12 which as been closed with the seat empty.

On the other hand, if the door is closed without an occupant in the vehicle seat, the detector 27 will hold the pin 34 in its retracted position as the door is closed so that the link 4 does not engage the pin 34, and thereby the belt transfer device will not be actuated. The closed position of the door in such an operating state is shown in FIG. 13.

Figure 14:
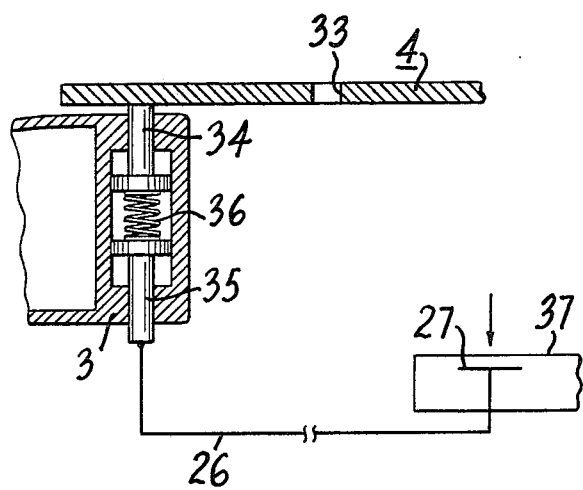
FIG. 14 is a schematic representation of a detector and interrupting mechanism for use with the linkage shown in FIGS. 10 through 13.

A reciprocating mechanism responsive to the weight on the passenger seat 37 for selectively retracting the pin 34 is shown in FIG. 14. The detector 27 is mounted beneath the vehicle seat 37 and is thus moved as an occupant sits down. Movement of the detector 27 is transmitted through a cable 26 to a piston 35 coupled by a spring to the retractable pin 34. Thus the weight of the vehicle occupant will act to bias the pin 34 upwardly, and as the door is closed, will cause the pin 34 to engage the hole 33.

Although the invention has been shown and described with reference to certain preferred embodiments thereof, it will be understood that variations and modificaions will be apparent to those skilled in the art without departing from the invented concepts disclosed herein. All such modifications and variations are intended to be within the scope of the present invention, as defined in the following claims.

I claim:

1. In a passive occupant restraint belt system for vehicles which includes a restraining belt, belt transfer means engaging the belt for moving the belt between the restraining and the releasing positions and motion transmission means coupled to the belt transfer means for transmitting and amplifying opening motions of the door to the transfer means, the transmission means including a motion amplifier mounted on either the vehicle body or door and a linkage having one end attached to the other of the body and door and the other end coupled to an input component of the motion amplifier, wherein opening and closing movement of the door is transmitted through said linkage to said motion amplifier, the improvement comprising means for interrupting motion transmission through the linkage wherein the linkage comprises two links pivotally connected at a common joint, and detector means coupled to the vehicle seat to be responsive to the weight on the seat for actuating the interrupting means comprising means for selectively locking the joint when a passenger is sitting in the seat and unlocking the joint when the seat is empty.

2. Apparatus according to claim 1, wherein the interrupting means is a cylinder filled with a non-compressible liquid, an auxiliary tank communicating with the cylinder, and valve means between said cylinder and the auxiliary tank, and wherein the detector means is coupled to the valve means for closing the valve means when a passenger is in the seat and for opening the valve means when the seat is empty.

3. Apparatus according to claim 1, wherein the interrupting means comprises a retractable pin mounted to the vehicle body or door and a cooperating hole in the linkage for receiving the pin, wherein the linkage is free to slide relative to the vehicle body or door when the pin is retracted from the hole, reciprocating means for moving the pin into and out of the hole including biasing means acting on the pin for urging the pin toward the hole, and wherein the detector means is coupled to the reciprocating means for retracting the pin when the seat is empty.

* * * * *